Aug. 13, 1968  R. GENIN  3,396,478
AUDIO-VISUAL INSTRUMENT
Filed July 14, 1967  5 Sheets-Sheet 1
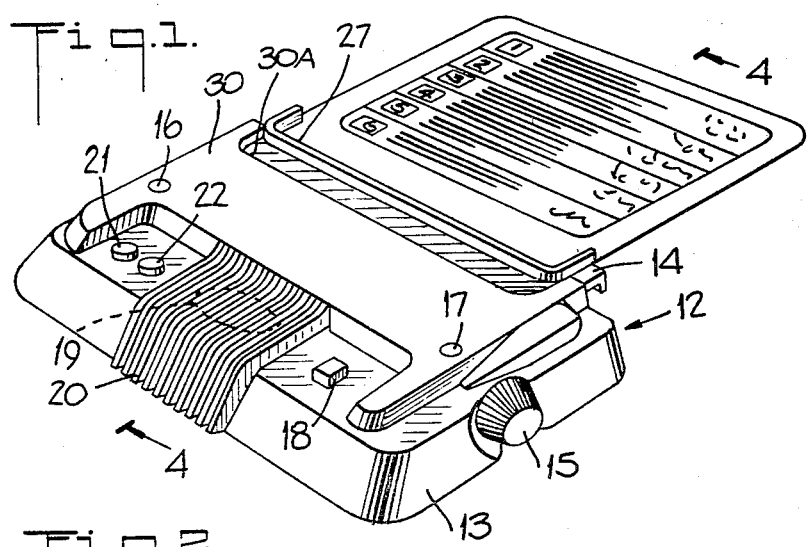
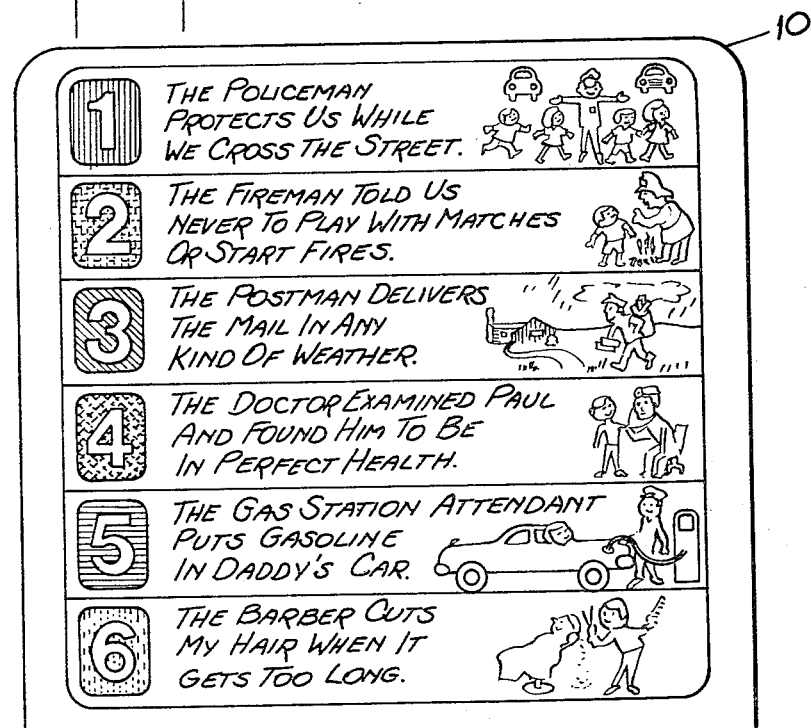
INVENTOR.
ROBERT GENIN
BY
ATTORNEY

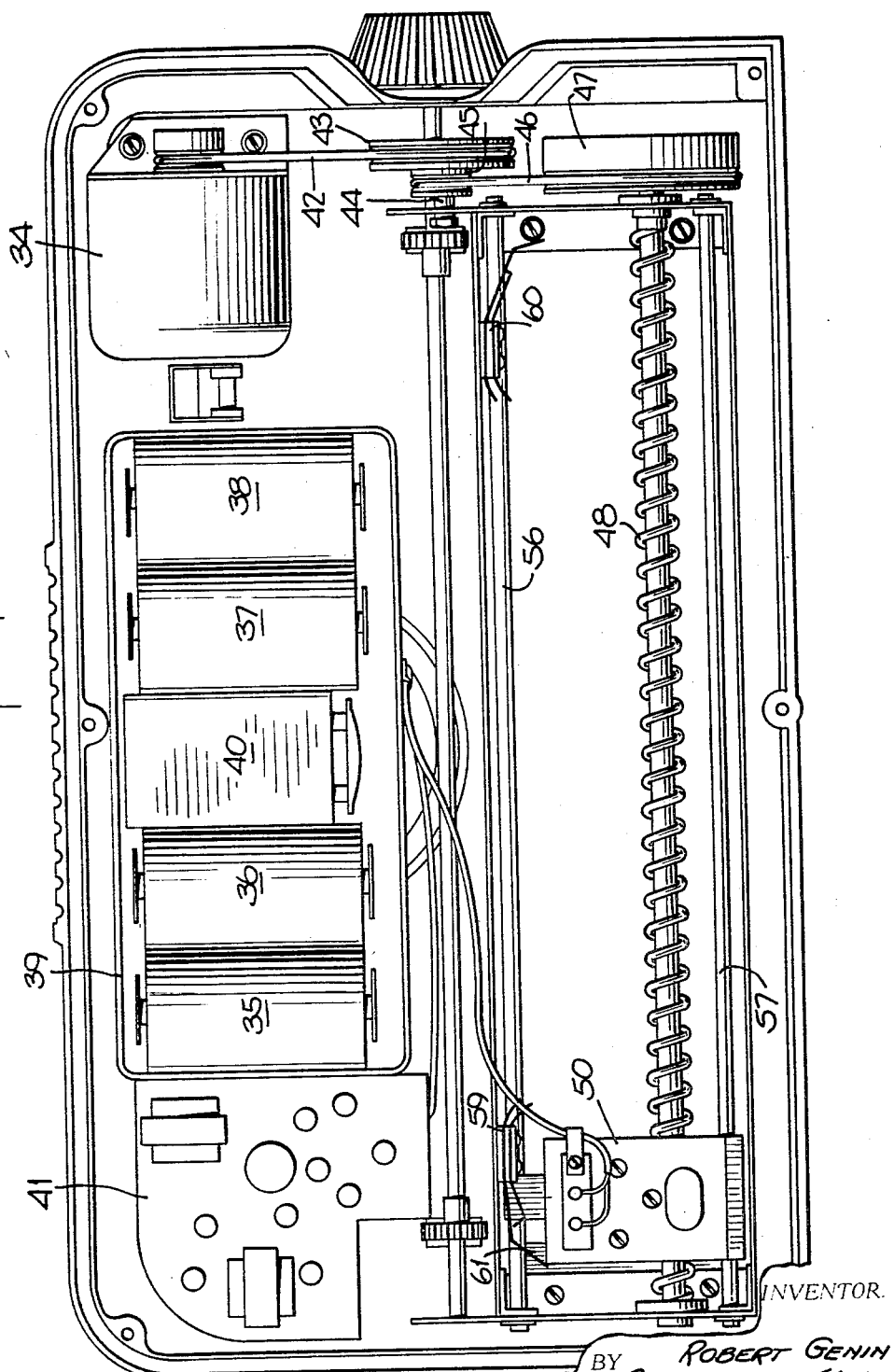

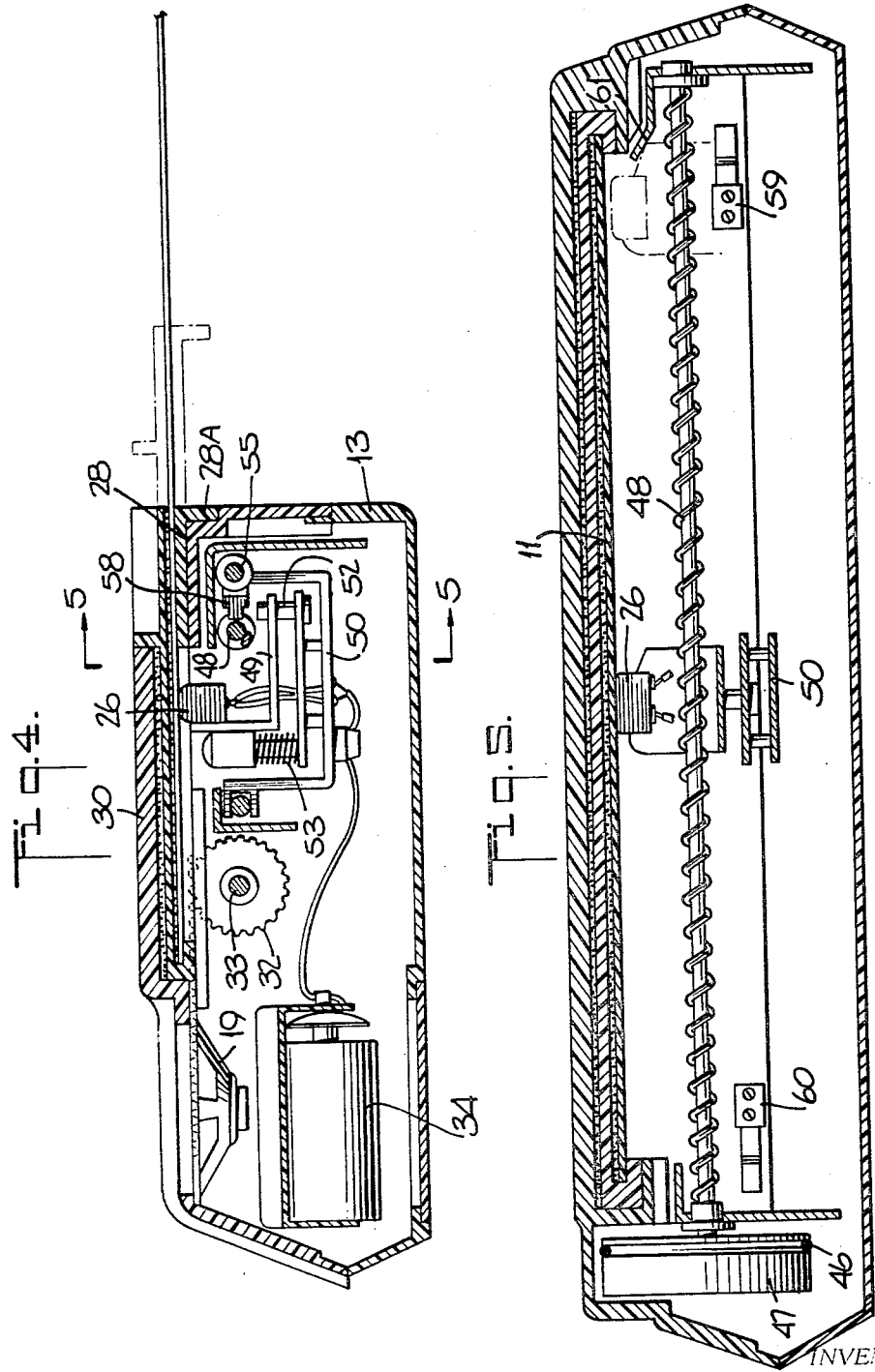

INVENTOR.
ROBERT GENIN
BY Michael Ebert
ATTORNEY

INVENTOR.
ROBERT GENIN
BY *Michael Ebert*
ATTORNEY

United States Patent Office 3,396,478
Patented Aug. 13, 1968

3,396,478
AUDIO-VISUAL INSTRUMENT
Robert Genin, Scarsdale, N.Y., assignor, by mesne assignments, to Amram et Fils S.A.R.L., a corporation of France
Continuation-in-part of application Ser. No. 601,645, Dec. 14, 1966. This application July 14, 1967, Ser. No. 653,519
8 Claims. (Cl. 35—35)

ABSTRACT OF THE DISCLOSURE

An audio-visual instrument wherein a card printed on its top face with a series of visual information bits and having on its rear face an equal number of pre-recorded parallel magnetic tracks containing verbal information related to the corresponding bits, is borne on a slide carrier which is selectively movable with respect to a playback head whereby the head may be aligned with a desired track and caused to scan across this track to reproduce the verbal information recorded therein.

RELATED APPLICATION

This application is a continuation-in-part of the copending application of Genin and Wapner, Ser. No. 601,645, filed Dec. 14, 1966.

This invention relates generally to audio-visual teaching tools, and more particularly to an autodidactic device whereby a student presented with several printed words, pictures or other items of visual information may then elect to hear any one of these words, or to hear verbal instructions respecting a selected item.

The crucial problem besetting the field of child education is the reading process, for unless a child is able to read, he is foreclosed from knowledge which can be acquired only from books. Learning to read, therefore, is the prelude to education, and without this facility the child is unable to make progress in school. Even children of low intelligence can speak and understand the spoken word. But the English language is not spelled phonetically, and while a beginner may have mastered the alphabet, he finds it difficult to read a word formed arbitrarily of a group of letters. To be meaningful, the overall visual impression made by the letters of a word must be translated into the familiar sound for that word.

For example, a simple word such as "KNOW" is impossible to pronounce if treated phonetically. Even when enunciated properly, the sound, by itself, does not tell the child that what is meant by "KNOW" is not the negative sense of this sound, but the sense of understanding. Hence, the young reader must, by rote, be made to relate the printed word "KNOW" not only with its sound, which is phonetically unrelated to its spelling, but to its specific sense as well. This reading ability can only be attained by dint of repetition until such time as the child is intellectually conditioned to immediately associate the printed symbols for a word with both its sound and meaning.

A child may have an average or even superior intelligence and yet encounter great difficulty in learning to read and spell. This is a universal problem in which many factors are involved. Thus the atmosphere of the classroom may be intimidating to the young child, he may be fearful of teachers, or be bored and unresponsive away from home. In some instances, resistance to reading assumes the proportions of a psychological block.

It is now recognized in educational circles that a child who in a formal classroom environment appears to have a low learning capacity, is capable of learning more quickly when the knowledge to be acquired is intermingled with or incidental to play activity or some simple mechanical actions under his direct control. Thus a child may find arithmetic difficult when dealing with numbers abstractly, yet he may acquire a ready facility with numbers when they are involved in a competitive game calling for physical manipulations tied in with simple arithmetic calculations.

In my copending application Ser. No. 601,645, filed Dec. 14, 1966, there is disclosed an audio-visual didactic device constituted by a playback assembly provided with a deck to support a card having a series of data bits printed on the front face thereof, and a strip of magnetic tape secured to the rear face and containing a like series of pre-recorded parallel tracks having verbal information thereon, each recorded track being related to one of the visual bits. A magnetic playback head is disposed on a trackway below the deck, a dial-operated advancing mechanism being provided to shift the position of the card on the deck in order to align the related recorded track on the tape with the visual bit on the card selected by the operator. Also provided is a motor-operated traversing mechanism which, when actuated, causes the head to scan the selected track to play back the verbal information thereon. Thus the operator, as he visually observes the selected bit on the card, is able to hear the related information.

This assembly functions as a self-operated autodidactic device adapted to present a student with several items of visual information, such as printed words, symbols or pictures, and to verbalize any word selected by the student or to give a brief verbal explanation of any item selected by the student. In effect, therefore, the device acts as a personal instructor who talks and explains under the command of the student, but who limits his verbal instructions to one bit of selected information at a time. Because the device is student operated it may be used at home away from distracting or unnerving influences, and because there are playful aspects to the use of the device, particularly since it is the teacher who now obeys the student, an ability to read may be acquired readily by children who have difficulty in learning.

The instruction card disclosed in the copending application is provided with notches adapted to receive spring-biased detents borne on a rack which is engaged by a pinion, the pinion being turned by the dial of the advancing mechanism to shift the card position on the deck. While this arrangement is workable, it has certain disadvantages, for with repeated use the edges of the notches may wear out, as a consequence of which the magnetic tracks on the card may be misaligned with respect to the playback head.

Accordingly, it is the main object of this invention to provide a self-teaching device wherein a series of items of visual information, such as printed words, appears on the front face of a card having a like series of magnetically recorded sound tracks on the rear face thereof, the card being placeable on the slide carrier of a playback assembly, a manually operated selector mechanism acting to align the carriage and the card thereon with a playback head which engages the recorded track associated with the selected item.

A significant feature of the invention lies in its exceptional simplicity and ease of operation, for each card may be of conventional size and have no more than, say, five bits of reading information printed thereon, the related five sound tracks all being recorded on a single strip of tape or other magnetic media on the rear face of the card. There is no limit to the library of such cards which may be formed, and a beginning student may first be supplied with a set of cards intended to teach him simple words which he can listen to, until such time as he has mastered these words, and thereafter supplied with a set of more difficult words.

While the autodidactic device lends itself to private use at home, remedial reading classes may be provided with such devices for the use of students to relieve teachers of the necessity for repetitive drill. The device is also useful for programmed instruction in which the subject matter is broken down into elemental bits to render it more digestible. Recent pedagogical developments have placed emphasis on pre-school training. To this end, the device is adapted to teach children in the three to five-year old age bracket, the alphabet and other elementary information, for the device is so easy to operate that assistance is not required. The invention is by no means limited to childhood teaching, and may be used for adult education as an aid in language instruction and for a multitude of other purposes where information is to be imparted in an easily digested manner.

Also an object of the invention is to provide a device of the above-described type, wherein the card includes an additional practice sound track which is not pre-recorded, but which may be recorded and played back by the student in order that he may compare a pre-recorded pronunciation of a word or any other sound, with his own version.

Still another object of the invention is to provide an autodidactic device which is of efficient, sturdy and compact design, which is reliable in operation, and which may be manufactured and sold at relatively low cost.

Briefly stated, these objects are accomplished in a device constituted by a slide carrier adapted to support a card having a series of visual information bits printed on the front face thereof and a like series of parallel pre-recorded magnetic tracks on the rear face thereof, each of which is related to one of these bits. Disposed below the carrier is a traversing mechanism which supports a playback magnetic head and is adapted to cause the head to scan across any one of the pre-recorded tracks, the carriage being selectively shiftable by the operator to effect exact registration between a particular track and the head.

For a better understanding of the invention, as well as other objects and further features thereof, reference is made to the following detailed description to be read in conjunction with the accompanying drawings, wherein like elements are identified by like reference numerals. In the drawing:

FIG. 1 is a perspective view of an audio-visual instrument in accordance with the invention;

FIG. 2 is a view of the front face of a typical card suitable for use with the instrument;

FIG. 3 is a plan view of the instrument as seen from the rear, with the back cover removed;

FIG. 4 is a transverse section taken through the instrument in the plane indicated by line 4—4 in FIG. 1;

FIG. 5 is a longitudinal section taken in the plane indicated by line 5—5 in FIG. 4;

FIG. 6 is an exploded view in perspective of the carrier for the card and the traversing magnetic playback head associated therewith;

GENERAL DESCRIPTION

Figure 8:
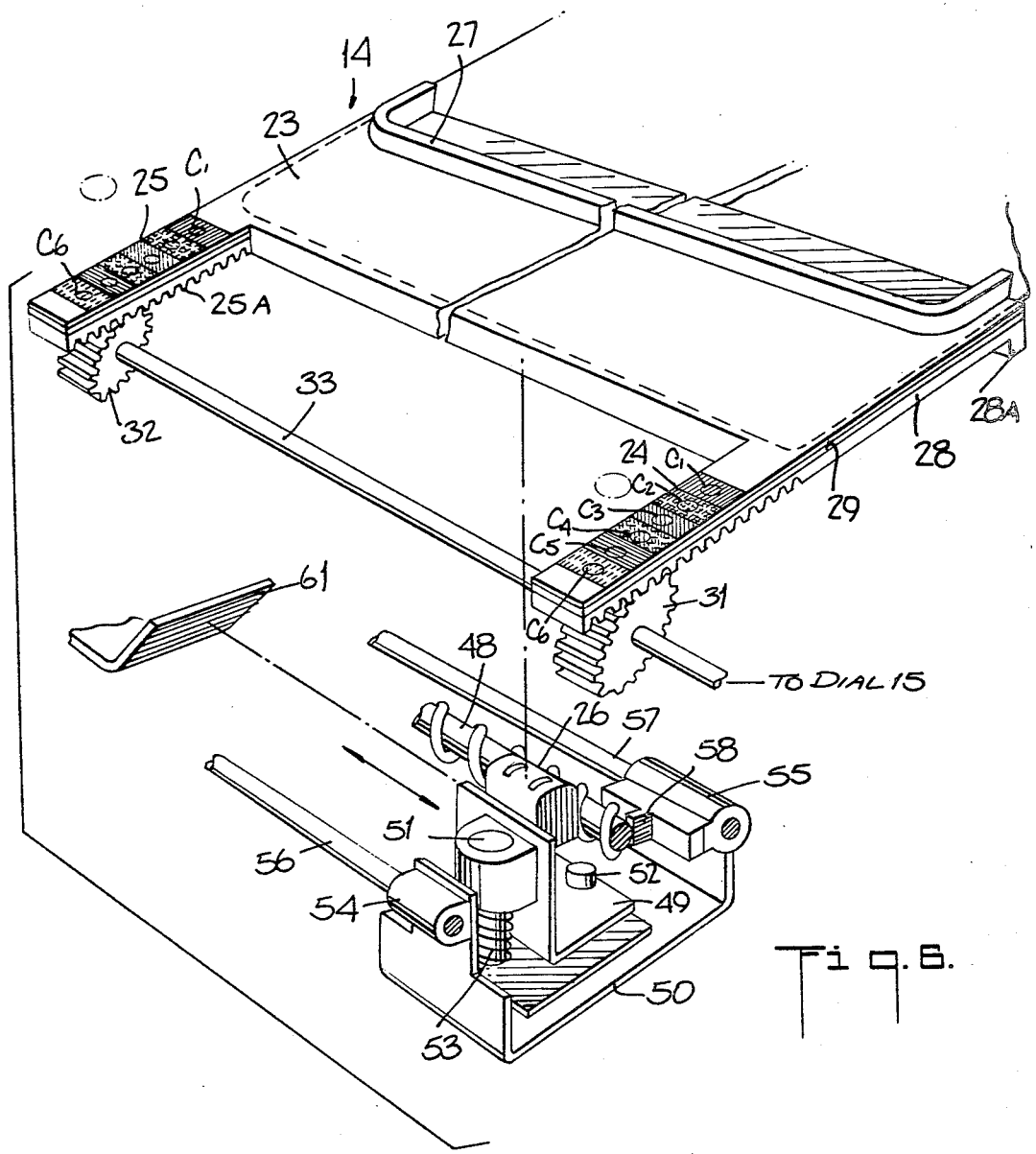
FIG. 8 is a schematic diagram of the electrical circuit of the instrument.
Figure 7:
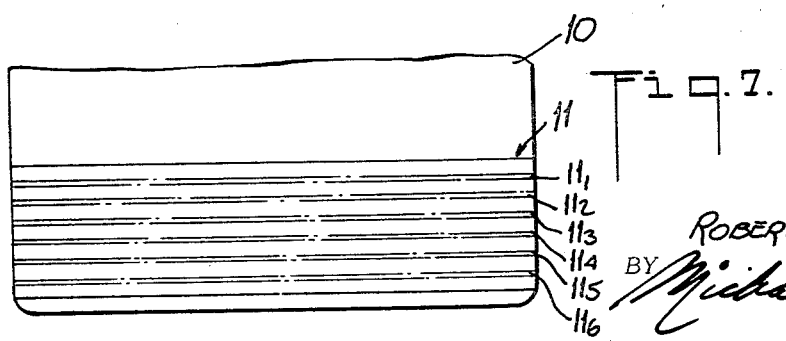
FIG. 7 shows in plan view, a portion of the rear face of the card with the magnetic tape secured thereto.
Figure 8:
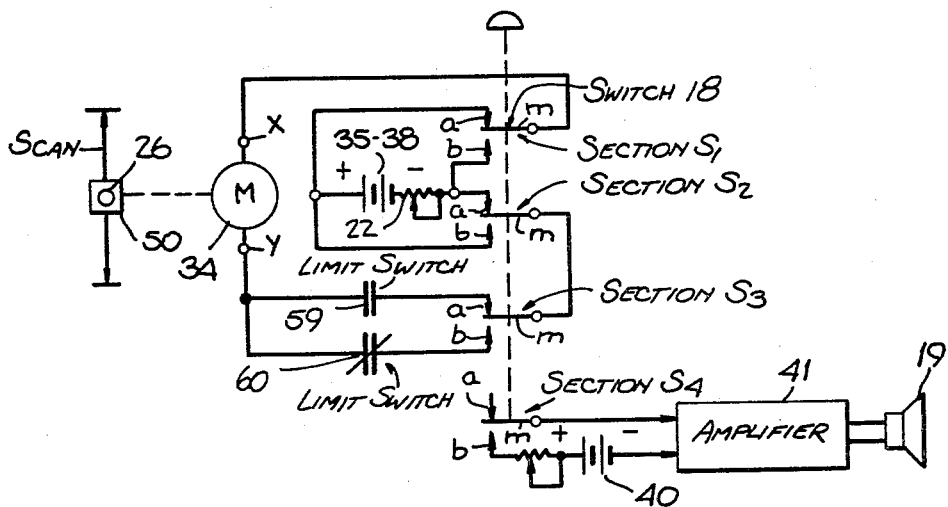

Referring now to the drawings, and more particularly to FIG. 2, there is shown a rectangular sample card 10 in accordance with the invention, the corners of the card being chamfered. The card in practice may be 8" x 10", or any other easily-handled size, the card having a series of information bits printed thereon on the front face thereof. By "bit" is meant any single piece of visual data, such as a word, a symbol, a picture, or even a question or statement. The card lends itself to modern programmed teaching techniques in which the material to be taught is broken down into elementary units or bits to simplify and facilitate the learning process.

In the sample shown by way of illustration, the printed matter on the card is divided into six bit sections identified by numbers 1 to 6, contained within differently-colored blocks. Thus block 1 may be red; block 2, yellow; block 3, green; block 4, orange; block 5, blue; and block 6, purple. The purpose of the numbers and colors is to facilitate selection of a given section by the student operator.

In section 1, there is the text, "The Policeman Protects Us While We Cross the Street," this text being illustrated by a policeman guiding children and signalling cars to a halt. In section 2, the text is "The Fireman Told Us Never to Play With Matches Or To Start Fires," this text being illustrated by a fireman remonstrating with a child who has started a small fire. The remaining sections similarly contain a simple text and an appropriate sketch illustrative thereof. It will be appreciated that these are simply samples of the kind of information bits which may be imparted to the learner, the bits illustrated being very elementary in nature. However, in practice, the information may range from the elementary to the intermediate and to the highly advanced, but always in programmed bits to facilitate the learning process.

On the rear face of the card adjacent the lower edge thereof, there is attached a strip of magnetic recording tape 11 having a series of six pre-recorded magnetic tracks $11_1$, $11_2$, $11_3$, $11_4$, $11_5$, $11_6$, disposed in parallel relation, each track being related in its recorded content to the correspondingly numbered bit section on the front face. It will be appreciated that the number of sections and tracks shown are by way of illustration only, and in practice, any number may be used for instructional purposes.

While the tracks are shown as pre-recorded on a strip of magnetic tape which is adhesively secured to the rear face of the card, an alterntaive technique for applying the tracks is by coating the rear face with an adherent layer or band of material having a ferromagnetic dispersion thereon. Thus the ferromagnetic coating may consist of finely divided particles dispersed in a suitable plastic vehicle.

For example, magnetic particles of ferric-oxide prepared in the manner disclosed in Patents 3,308,010 and Re. 25,998, may be dispersed in a resinous solution having vinyl, cellulosic or epoxy constituents, and then coated as by a reverse-roll coater machine, onto the rear face of the card, after which the wet coating is dried and cured to provide a smooth, adherent layer on the card which functions in a manner equivalent to magnetic tape and also provides a tough, protective coating to the card which prolongs its useful life.

The cards are used in conjunction with an audio-visual instrument, as illustrated in FIG. 1, which is generally designated by numeral 12, the instrument including a rectangular casing 13 containing the mechanical and electrical components of the instrument and supporting a slide carrier 14 which is adapted to receive the card 10. The position of the carriage and of the card carried thereby, is adjusted by a manually-operated dial 15 which controls an advancing mechanism and, when turned, selectively acts to register the tracks in the rear face of the card with a magnetic playback head. The selected section of the card is indicated through two indicator holes 16 and 17 on the top of the casing, which expose color markings corresponding to the colors in the numbered blocks on the card.

When a particular section on the card is selected by dial 15 and the student wishes to hear the related prerecorded track, he presses a switch button 18 which causes a playback head mounted on a motor-operated traversing mechanism, to scan across the track, the output of the head being electrically amplified and being heard through a loudspeaker 19 disposed below a grille 20 formed in casing 13. The volume of reproduction is varied by a volume control 21. Motor speed is controlled by a rheostat 22.

Since the motor is battery-operated, voltage tends to drop as the battery runs down, with a resultant reduction in motor speed. Since for good reproduction a constant speed is necessary, the motor speed control permits occasional adjustment of the speed to compensate for reduction in battery voltage. The motor-speed control also acts effectively as a tone control, for by running the scanning head faster or slower, the reproduced sound may be increased or decreased in pitch to improve the intelligibility of the sound, depending on the ear response of the listener.

STRUCTURE OF PLAYBACK ASSEMBLY

Referring now to FIGS. 3, 4, 5 and 6, the details of the playback assembly will now be considered. Carrier 14, as best seen in FIG. 6, is constituted by a rectangular top deck 23 having a pair of parallel arms 24 and 25 projecting forwardly therefrom, the undersides of which are provided with teeth to form racks 24A and 25A. The upper faces of arms 24 and 25 have color dots $C_1$ to $C_6$ printed thereon at spaced longitudinal positions, the colors of which match the colors 1 to 6 on the card, and the positions of which, as seen through holes 16 and 17 in the casing (FIG. 1) indicate that the related track ($11_1$ to $11_6$) on magnetic tape 11 is aligned with the magnetic recording head 26. This head is mounted on a traversing mechanism adapted to effect scanning motion of the head within the space between rack arms 24 and 25, as will be later described.

The upper deck 23 of carrier 14 is provided with a raised and curved cowling 27, the deck area within the cowling being cut open to expose a lower deck 28 which is spaced from the upper deck by a spacer sheet 29, to provide an entrance therebetween sufficient to admit card 10, the lower deck having a downwardly-extending end flange 28A which serves to limit the movement of the carrier.

Carrier 14 is supported for movement on a frame 30 which is secured to the top of casing 12, the frame 30 having a curved indentation 30A which is dimensioned to admit cowling 27 on the top deck of the carrier. When the lower portion of card 10 is inserted in the entrance between the upper and lower decks of the carrier, as shown in FIG. 4, the underface of the card 10 with magnetic tape 11 is exposed through a rectangular opening 28B in the under deck, which opening admits magnetic playback head 26 and permits it to engage the surface of the tape.

Movement of the carrier and the card thereon is effected by a pair of pinions 31 and 32 which engage racks 24A and 25A, respectively, the pinions being mounted on a shaft 33 to which dial 15 is connected. Thus as dial 15 is turned either clockwise or counterclockwise, carrier 14 is shifted accordingly, the operator selecting any one of the bit sections on card 10 by aligning the related color dot $C_1$ to $C_6$ with the indicator holes 16 and 17 on the top of the casing. The selection of a particular bit section causes carrier 14 to align the related pre-recorded track section on the rear face of the card with the magnetic air gap on playback head 26.

To avoid the need for close tolerances, magnetic tape 11 is pre-recorded so as to produce relatively broad tracks, all of which are in parallel relation, whereas the gap of head 26 is relatively narrow, so that even if the head is not in perfect registration with a selected track, it will lie within the pre-recorded region.

The traversing mechanism for head 26 is driven by a motor 34 which, as shown in FIG. 3, is energized by a set of four small batteries 35, 36, 37 and 38 (1.5 volts) held within an enclosure 39. A battery 40 within this same enclosure provides power for the transistorized electronic amplifier 41 whose input is connected to playback head 26, and whose output is supplied to loudspeaker 19. Motor 34 is coupled by an endless belt 42 to a pulley 43 mounted on a shaft 44 on which is mounted a smaller pulley 45 which is coupled by an endless belt 46 to the flywheel 47 keyed to the end of a lead screw 48.

Head 26 is mounted on a spring-biased, right-angled pedestal 49 which is supported on a scanning carriage 50. Pedestal 49 is elevated on two spaced posts 51 and 52, an expansion spring 53 surrounding post 51 serving to urge the pedestal upwardly so as to press head 26 against the magnetic track on the card. Carriage 50 is formed by a U-shaped plate whose feet are provided with shoe bushings 54 and 55 which ride on a pair of parallel rails 56 and 57. Rails 56 and 57 are positioned below the rack arms 24 and 25 of the card carrier and extend therebetween to effect traversal of the head across the magnetic tape.

Movement of the carriage is effected by a lead screw 48, this being accomplished by means of a tab 58 secured to bushing 55 and engaging the helical path of the lead screw. Thus when motor 34 turns in one direction, carriage 50 and head 26 thereon move from right to left (FIG. 3) to scan the magnetic track on the card aligned therewith, and when the motor action is reversed, the carriage returns to its starting position. Carriage 50, as best seen in FIG. 3, engages limit switches 59 and 60 at either end of its travel path, each switch being biased closed, and being opened when engaged by the impinging edge of the carriage to break the motor circuit and thereby arrest carriage movement. The function of these switches will be described in greater detail in the section to follow on the electrical circuit.

In order to permit the insertion of cards in the carrier, it is necessary to retract playback head 26 from the magnetic tape. This is accomplished, as best seen in FIGS. 3 and 6, by an inclined plate 61 which, when the carriage 50 returns to its start position, engages the upright portion of the pedestal 49 and forces this spring-biased pedestal down against the carriage, thereby withdrawing the head from the magnetic tape. This action occurs only at the start position, and when the carriage departs therefrom, the head is again urged upwardly by the pedestal spring to engage the magnetic track.

CIRCUIT OF PLAYBACK ASSEMBLY

As shown in FIG. 8, the operating circuit for the playback assembly includes batteries 35, 36, 37 and 38, which in a practical embodiment are 1.5 volt cells connected in series to provide a six-volt supply for a six-volt motor 34, and a battery 40 which in practice may be a nine-volt cell to energize the transistor amplifier 41, whose output is connected to loudspeaker 19.

Switch 18 is a double-pole, double-throw multisectional switch having four ganged sections $S_1$, $S_2$, $S_3$, $S_4$, each having a movable contact $m$ which normally engages a fixed contact $a$, and which when depressed by the operator is caused to engage a fixed contact $b$.

The movable contact $m$ of section $S_1$ is connected to terminal X of motor 34, terminal Y of the motor being connected through limit switch 59, which is at the start position of the carriage, to fixed contact $a$ of section $S_3$, whose movable contact $m$ is connected to movable contact $m$ of section $S_2$. Limit switch 59 is initially held open, for it is engaged by the carriage at the start position. Fixed contact $b$ of section $S_3$ is connected through the limit switch 60 to terminal Y of motor 34, and since the carriage is initially at the start position in engagement with limit switch 59, limit switch 60 is initially closed.

The positive side of the motor batteries 35 to 38 is connected to fixed contacts $a$ of switch $S_1$, and also to fixed contact *b* of section S₂, while the negative side is connected through speed control rheostat 22 to fixed contact *b* of section S₁ and fixed contact *a* of section S₂. The direction of motor movement depends on the polarity of the applied voltage, and as will later be evident, when switch 18 is depressed, voltage is applied in one polarity and when released, it is applied in the reverse polarity.

The limit switch 59, as pointed out before, is initially open, for it is at the start position of carriage 50, and it closes when the carriage shifts to scan a selected track, at the end of which travel the carriage encounters the initially closed limit switch 60, which is then caused to open.

In the condition shown in FIG. 8, movable contacts *m* of the sections of switch 18 are on fitted contacts *a*. When switch 18 is depressed, the motor batteries 35 to 38 are connected at their negative side through contact *b* of switch S₁ to terminal X of motor 34, the positive side going through contact *b* of section S₂ in series with contact *b* of section S₃ and the closed limit switch 60 to the terminal Y of the motor, thus causing the motor to turn in a direction advancing the carriage away from the start of scanning on a selected track to the finish thereof. At the finish, the carriage causes limit switch 60 to open, thus automatically breaking the circuit.

When switch 18 is released either at the end of the track scan or before, the movable contacts *m* all return to contacts *a* of their respective sections, and in this condition the positive sides of the batteries 35 to 38 now go to terminal X of the motor, while the negative sides go to terminal Y through contacts *a* of sections S₂ and S₃ in series and through the now closed limit switch 59. Thus the direction of the motor is reversed, and the carriage retraces, and when it returns to the start position, it causes limit switch 59 to reopen, thus again breaking the motor circuit and restoring the initial condition.

In the circuit shown in FIG. 8, it will be seen that amplifier 41 is connected to its battery 40 in series with volume control 21 only when contact *m* of switch section S₄ engages the fixed *b*-contact thereof, and is disconnected when the fixed contact *a* is engaged thereby. Hence the amplifier is rendered operative only when motor switch 18 is depressed to cause the head to scan across a selected track, but when switch 18 is released to cause the head to retrace, the amplifier is inoperative. Hence no sound is heard on retrace.

RECORDING FEATURE

For practice purposes, an additional sound track may be placed on the magnetic tape, which track however, is not pre-recorded. Thus in the five-track embodiment shown, a sixth track position would be provided and the slide carrier would have a record position to permit the student to record and then play back.

Figure 9:
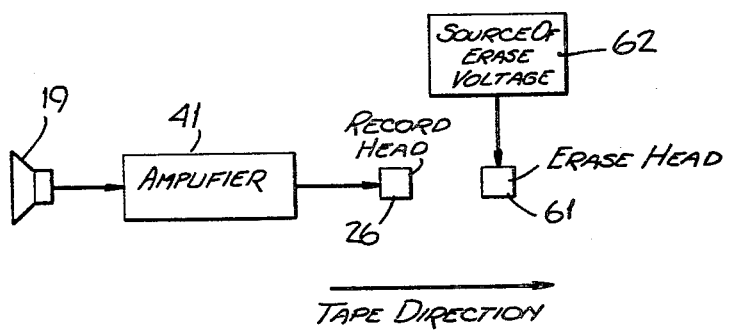
FIG. 9 illustrates in block diagram the circuit arrangement which is operative when the instrument is used to record magnetically rather than to play back information.

The purpose of this feature is to make it possible for a student to record his own version of a word or phrase, or any other intelligence, for comparison with pre-recorded material on any of the other tracks. To this end, the same basic electronic components are used, except that an erase head 61 is added to the carriage, as shown in FIG. 9, and a source 62 of erase voltage is provided in accordance with well-known magnetic recording techniques.

A switch is arranged to operate when the carrier is in its "record" position to switch speaker 19 from the output to the input of amplifier 41, and to switch head 26 to the output of the amplifier. Thus the speaker now acts as an electrodynamic microphone into which the student may speak, and the playback head now functions as a recording head. The erase head erases the track prior to recording, to permit reuse thereof. After recording, the track may be played back, using the playback arrangement discussed previously.

OPERATION

Referring again to FIG. 1, the operation will now be described. To operate the instrument, a student takes a teaching card 10 of his choice and inserts it in the carrier 10 of the playback assembly. The student views the card and then decides that he wishes to hear, say, Section 3. He then turns dial 15 to a position at which the same color as Section 3 is seen through the indicator holes 16 and 17. The student then presses switch 18.

In pressing switch 18 and holding it depressed, the motor 34 is caused to operate and at the same time the amplifier is rendered operative, as a consequence of which the magnetic playback head 26 is caused to scan across the selected pre-recorded track, so that the student hears what he also sees. The student may, if he wishes, repeat the scanning operation.

In a practical embodiment, using a magnetic tape seven inches long on a card eight inches wide, and running the head at a rate of one inch per second, a seven-second period is available for recording. The head may be run even more slowly without excessive loss of intelligibility. Thus it is not only possible in a seven-inch track to record a single word, but to record brief statements. This is useful where the cards are used for more elaborate teaching techniques to provide explanations or to give answers to questions appearing on the card sections.

The student keeps the switch depressed until the playback of a track is completed, and he then releases the switch to permit the head to return to its start position. If the student changes his mind in the course of playback, he can release the switch before playback is completed and the head will immediately return to start from an intermediate position.

While there has been shown and described a preferred embodiment of audio-visual instrument in accordance with the invention, it will be appreciated that many changes and modifications may be made therein without, however, departing from the essential spirit of the invention as defined in the annexed claims.

What I claim is:
1. An audio-visual instrument comprising:
   (A) a card having a series of visual items printed on the front face thereof, and a like series of pre-recorded magnetic tracks each related to a respective visual item and formed on the rear face thereof, and
   (B) a playback assembly including:
      (a) a slidable carrier for supporting said card, said carrier exposing said tracks on the rear face to a scanning path,
      (b) a magnetic playback head movable under said carrier in said path,
      (c) a traversing mechanism coupled to said head to effect motion thereof along said path from a start to a finish point and return,
      (d) manually-operated means engaging said carrier to shift same with respect to said head to bring said head into operative relation with a selected track on said card, and
      (e) electronic means coupled to said head to reproduce the played-back track.

2. An instrument as set forth in claim 1, further including an electric motor to drive said traversing mechanism, and a control circuit for said motor, including limit switches at said start and finish points to cause said motor to reverse direction when the head reaches said finish position and to stop when it reaches the start position.

3. An instrument as set forth in claim 1, wherein each item on said card is identified by a distinct color, and wherein said carrier includes a row of like colors to facilitate aligning said head with a track corresponding with a selected color.

4. An instrument as set forth in claim 1, wherein said electronic means includes an amplifier whose output is coupled to said head, and an electromagnetic speaker coupled to the output of the amplifier.

5. An instrument as set forth in claim 1, wherein said card includes an additional track which is unrecorded, and further including recording means to record on said additional track by means of said head.

6. An instrument as set forth in claim 5, wherein said recording means uses said speaker as a microphone which is coupled to the input of said amplifier.

7. An instrument as set forth in claim 1, wherein each item is a printed word, and the related track carries the sound of said word.

8. An instrument as set forth in claim 1, wherein said tracks are formed in a resinous layer adherent to said card and having ferromagnetic material dispersed therein.

References Cited

UNITED STATES PATENTS

| | | | |
|---|---|---|---|
| 2,849,542 | 8/1958 | MacChesney | 35—35 XR |
| 3,020,360 | 2/1962 | Gratian et al. | 35—35 XR |
| 3,307,274 | 3/1967 | Glaser | 35—35 |
| 3,348,320 | 10/1967 | Brokaw | 35—35 |

EUGENE R. CAPOZIO, *Primary Examiner.*

WILLIAM H. GRIEB, *Assistant Examiner.*